Oct. 7, 1969
F. R. SCHNEIDER
3,471,706
VEHICULAR REMOTE POWER UNIT
Filed Aug. 17, 1966
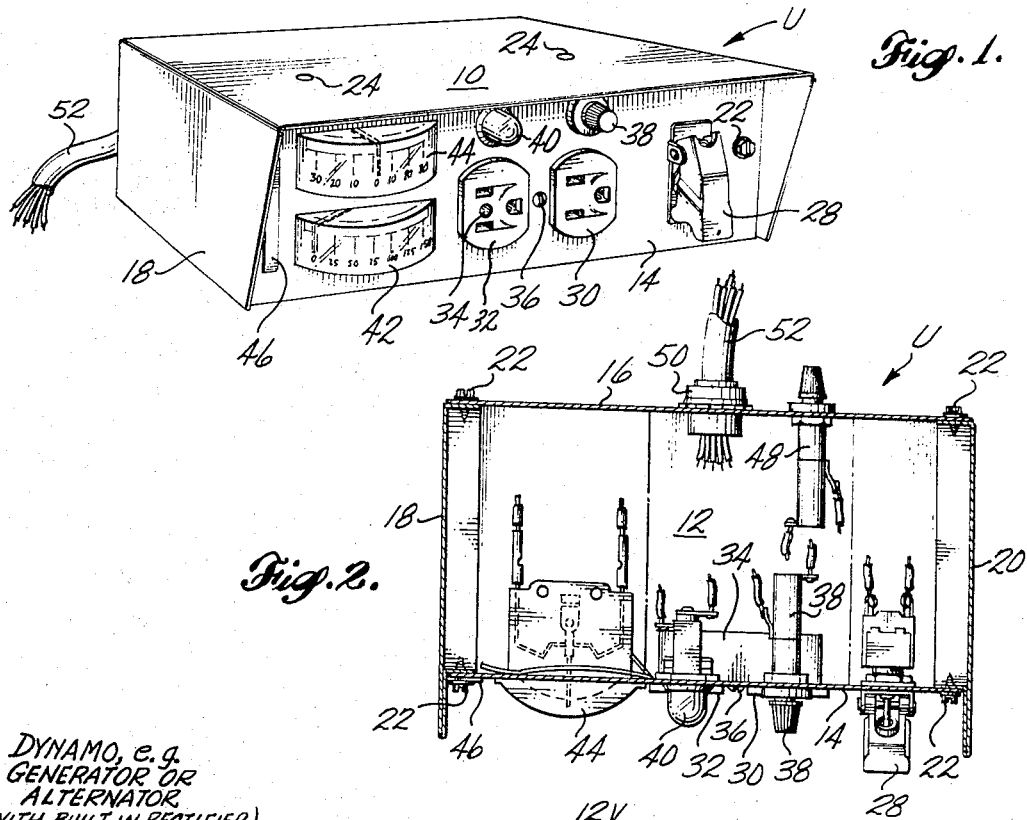
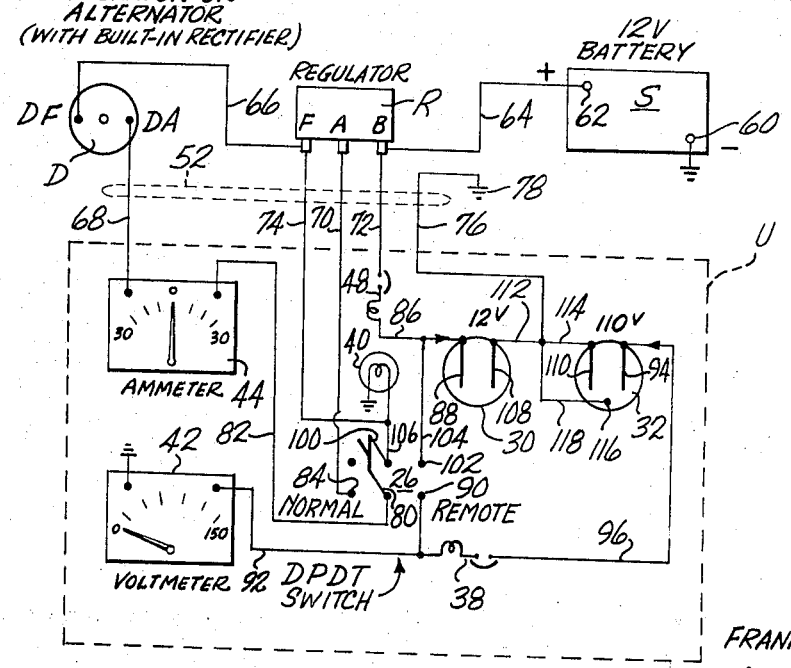
INVENTOR
FRANKLIN R. SCHNEIDER
ATTORNEYS United States Patent Office 3,471,706
Patented Oct. 7, 1969

3,471,706
VEHICULAR REMOTE POWER UNIT
Franklin R. Schneider, Seattle, Wash., assignor to Modern Industries Incorporated, Seattle, Wash., a corporation of Washington
Filed Aug. 17, 1966, Ser. No. 573,060
Int. Cl. H02j 1/04
U.S. Cl. 307—10                                                21 Claims

ABSTRACT OF THE DISCLOSURE

A vehicular power output accessory unit including separate independently fused, double conductor, high and low voltage DC output receptacles with the low voltage receptacle in circuit with the vehicle battery. A double throw, double pole switch is provided with a pole connectible to either the vehicle electrical system for normal operation or to the ungrounded conductor of the higher voltage output receptacle for remote operation. A voltmeter is connecetd to the higher voltage output receptacle. The second pole of the switch is connected between an indicating light and the battery when the switch is in position for remote operation.

---

The present invention relates to a power output accessory unit for installation in an internal combustion engine powered vehicle or the like, to develop from an input from the engine driven dynamo of the vehicle, a higher voltage DC power output for "remote" operation of an electrical power utilization device such as a 110–120 volt AC-DC power tool or the like.

More particularly, the power output accessory unit of the present invention, operated in conjunction with the conventional electrical system of an engine powered vehicle and appropriately controlled as to voltage and current output by appropriate regulation of the speed of the engine of the vehicle, functions to provide a DC power output at a voltage adequate for efficient operation of the power tool or the like, and at a current within the design power rating of the engine driven dynamo of the vehicle.

Heretofore, to obtain a higher voltage power output for auxiliary use on or in the vicinity of a vehicle, it is in some instances customary to have a separately operable motor-generator system on the vehicle, or at least a second AC or DC dynamo driven by the vehicle engine in order to provide either a 110–120 volt AC or 110–120 volt DC power output. Either of these systems, involving a second, separate dynamo for the desired remote power output, is relatively expensive, particularly when one considers the mechanical requirements for mounting and driving the second dynamo, and the separate wiring system incident thereto.

Also known is the type of vehicular auxiliary power circuit known generally as converters, which take a relatively low voltage DC input from the vehicle electrical system and converting to an AC voltage by means of a vibrator or the like (or simply deriving an AC output directly from an engine driven AC generator or alternator, as in Snyder U.S. Patent No. 3,174,048), then increasing the voltage value to a desired level by step-up voltage transformer means. In any such converter unit there is an inherent power loss in the energy conversion, and the essential step-up power transformer means is a necessary and relatively expensive component, particularly when the power output is to satisfy the power demand of power tools or the like having substantial power ratings.

When using converter type remote power sources the factor is also to be considered that many power tools and the like are of the so-called AC-DC type and, while operatable on either AC power or DC power, have better performance characteristics when operated from a DC power source at rated voltage.

In a converter type power unit, in order to get a DC power output at rated voltage, it is necessary to convert to AC, then increase the voltage level, then reconvert to DC power by additional rectifier means or the like, which of themselves involve power loss and can be relatively expensive.

In order to obviate the inefficiency, expense and complexity of conventional DC to AC power converter units, the vehicular power accessory unit of the present invention avoids any power conversion in attaining the desired higher DC voltage level. This is done by disconnecting the dynamo DC output of the vehicle electrical system from the power consumption and regulator circuits of the vehicle and applying it directly to the remote power load, with suitable regulation as to engine speed to provide a power output at a DC voltage approximating the rated voltage of the load so that the load is operated efficiently, yet with safeguards as to current drain so as to maintain operation of the vehicle dynamo within design rating. In this respect, it has been found that engine driven dynamos in common vehicular usage are readily capable of sustained operation at voltage levels considerably higher than the voltage rating of the vehicle's electrical system, so long as the current drain on the dynamo is small enough to keep the dynamo operating within its design power rating.

Incident to such manner of providing a higher voltage remote DC power output, protection of the vehicle dynamo and the power tool or the like is provided by means of circuit breaker means in the unit, operable to relieve the dynamo of the load in the event the power drain on the engine driven dynamo substantially exceeds its power rating. The power accessory unit of the invention also has the advantage it has no substantial drain on the battery of the vehicle when operating power tools or the like from the engine driven dynamo. The unit also has the advantage that it is always "in circuit" except for a simple "local/remote" switch, i.e., no rewiring or manual disconnection and connection is necessary once the remote power unit is installed in the vehicle. The unit further provides voltmeter means and ammeter means readily viewable by the operator of the vehicle and providing adequate information to the operator for regulation of vehicle engine speed to maintain the remote output at the desired voltage level, which ammeter means is also "in circuit" and functioning to indicate the extent of output current to the vehicle operator while the vehicle is being operated normally.

Yet other advantages and features of the present invention include the flexibility of use thereof for battery charging, for starter voltage tests, for general voltmeter testing, and the like.

These and additional objects, features, advantages and characteristics of the type of vehicular remote power accessory units here presented, will be apparent from the following discussion of typical forms thereof, taken together with the accompanying illustrations of a typical unit, wherein like letters and numerals refer to like parts, and wherein:

FIG. 1 is a front perspective view of an encased remote power accessory unit designed for mounting conjunctively with the instrument panel of a vehicle;

FIG. 2 is a top plan view of the unit shown in FIG. 1, with the case broken away and with the various conductors fragmented to more clearly show the physical layout of the unit components; and FIG. 3 is a schematic drawing of the electrical circuitry of the unit shown in FIGS. 1 and 2, showing the internal electrical connections thereof, and the electrical connections thereof to the electrical system of the associated vehicle.

The remote power unit U, as shown at FIGS. 1 and 2, includes respective top and bottom panels 10, 12, front and rear panels 14, 16, and end panels 18, 20, assembled together as by means of screws 22. In a typical instance, the physical dimensions of such unit U are 8" x 5" x 3" and, as will be readily understood, such unit U can be mounted in any desired position conjunctively with the instrument panel of the associated vehicle, as by being bolted to the underside of the vehicle instrument panel with bolts appropriately passing through the instrument panel undershelf and through holes 24 in the top panel 10.

In such typical unit, as shown in FIGS. 1 and 2, front panel 14 mounts a double pole double throw switch 26, which is conventional per se, having a first "normal" position and a second or "remote" position, with the "remote" position preferably being guarded by pivotally movable guard 28. Front panel 14 also mounts a double conductor 12 volt DC output receptacle 30, and a double conductor 110–120 volt DC output receptacle 32 (suitably with a distinguishing coding such as provided by red inlay 34), the output receptacles 30, 32 being suitably a single subassembly as shown in FIG. 2 at 34, and held in place in the front panel 14 by suitable means such as retainer screw 36. Circuit breaker means, such as fuse 38 in the 110 volt output circuit, as well as an indicator light 40, a voltmeter 42, an ammeter 44, and a nameplate 46, are also mounted on the front panel 14.

Rear panel 16 of the unit U, in turn mounts 12 volt circuit breaker means such as fuse 48, and cable retainer 50, through which the electrical conduit cable 52 leaves the unit and leads the various unit conductors to their points of connection to the electrical system of the vehicle, as further discussed below in connection with FIG. 3.

As readily understood, and as shown in FIG. 3, the conventional vehicle electrical system commonly comprises a 12 volt DC storage battery S with a grounded negative terminal 60 and an ungrounded positive terminal 62; an engine driven dynamo D with a field winding terminal DF and an armature related DC output terminal DA; and a voltage regulator R having a battery terminal B connected by connector 64 to the ungrounded terminal 62 of battery S, a field terminal F connected to the field winding terminal DF of the dynamo D, and an armature terminal A normally connected to the output terminal DA of the dynamo D, such normal connection being by a conductor which is not shown, for clarity.

In installation of the power accessory unit U on the vehicle, the battery conductor 64 and the field winding conductor 66 between the dynamo terminal DF and regulator terminal F are left intact, while the normal connection between the dynamo output terminal DA and the armature terminal A of the regulator R is removed. In its place, conductor 68 from the unit U is connected to the dynamo output terminal DA, and conductor 70 from the unit U is connected to the armature terminal A of the regulator R. In addition, a 12 volt input goes to the unit U directly from the battery S, which input is conveniently obtained by connection of unit conductor 72 to the battery terminal B of regulator R, and a bypass field connection is preferably also made from the unit U to the field winding of the dynamo D, suitably by connection of conductor 74 to the field terminal F of the regulator R. To complete the installation of the unit U, the unit ground conductor 76 is suitably connected to a ground point on the vehicle, as indicated at 78.

With these unit-to-vehicle conductors 68–76 thus connected, one pole 80 of the double pole double throw switch 26 is connected to the output terminal DA of the dynamo D through ammeter 44 and conductor 82. With double pole double throw (DPDT) switch 26 in what may be termed its first or "normal" position, said pole 80 is in contact with switch contact 84 to which the conductor 70 from regulator terminal A is connected. In such "normal" position, the usual connection of the regulator terminal A to the dynamo output terminal DA is maintained through a conductor 68, ammeter 44, conductor 82, pole 80 and conductor 70, and "normal" vehicle operation can proceed. In addition, by separate circuitry, the direct 12 volt input to the unit U through conductor 72 and circuit breaker means 48 (suitably selected to break circuit under a load of 30 amperes, for example) is connected through conductor 86 to the ungrounded conductor 88 of 12 volt DC power output receptacle 30, so that a 12 volt power output is available at the unit at all times, such as for the operation of a 12 volt auxiliary light, either separately or in conjunction with operation of a power tool from the unit, for example.

Movement of the first pole 80 of the switch means 26, from such first or "normal" position to what may be termed its second or "remote" position, functions to electrically disconnect the dynamo output terminal DA from the regulator terminal A and to electrically connect the dynamo output circuit to switch contact 90, which is in turn connected to the ungrounded terminal of voltmeter 42 through conductor 92 and to the ungrounded conductor 94 of the 110–120 volt DC output receptacle 32, through circuit breaker means 38 and conductor 96. Said circuit breaker means 38 is suitably selected to break circuit at current in excess of 10 amperes, for example. In such second or "remote" position of the switch means 26, the second pole 100 thereof contacts switch contact 102 which is connected to the 12 volt input conductor 86 through conductor 104. Through this circuit, including the second switch pole 100, indicator light 40 is energized from the 12 volt circuit through its connection 106 to the second switch pole 100. Said light 40 functions to indicate to the user that the 110–120 volt output circuit is "in circuit." Also, through conductor 74 and its connection to conductor 106, the placement of the second switch pole 100 in its second position connects the 12 volt circuit directly to the field winding of the dynamo D during "remote" operation, to bypass the regulator R during "remote" operation and ensure the maintenance of adequate dynamo field regardless of engine speed or operating condition of the regulator R.

As shown in FIG. 3, respective grounded conductors 108, 110 of the output receptacles 30, 32 suitably are connected together by conductors 112, 114 and connected to the grounded conductor 76. Passive ground conductor 116 of the 110–120 volt output receptacle 32, when used, can also be connected to this ground circuit through conductor 118, as desired.

When switch 26 is in its "remote" position, both the ammeter 44 and voltmeter 42 are "in circuit" and provide dynamic indication of the output current flow and output voltage, enabling the operator of the vehicle to regulate the speed of the vehicle engine and thereby maintain the value of the output voltage at the appropriate value for efficient operation of the load consistent with the power rating of the load and the power output capability of the dynamo D.

To illustrate typical power tool or like operation using the installed power accessory unit of the present invention, and with the switch in its "normal" position and with the vehicle engine idling, the power cord of a 110–120 volt rated power tool such as a power saw is plugged into the 110–120 volt DC outlet receptacle 32. Then, with the vehicle engine speed increased to slightly above idle speed, the switch 26 is moved to the "remote" position and the readings on voltmeter and ammeter 44 are observed as the power tool begins to operate. By reason of the internal impedance of the load, the power output circuit automatically adjusts to the amperage demand of the tool and the operator need use only regulation of engine speed to supply an appropriate voltage for efficient tool operation. It has been determined that any DC voltage from about 70 to 110 volts is usually adequate for efficient operation of most power tools rated at 110–120 volts AC-DC, and it has also been observed that the motors of such tools often produce more speed and torque when DC powered than when powered at comparable voltage from a conventional AC voltage source. When stopping operation of the tool powered from the unit U, it is preferable to return the switch 26 from "remote" to "normal" position while the vehicle engine is still running.

As will be readily understood, the load applied to the output from 110–120 volt receptacle 32 should have a design power rating no greater than the design power rating of the vehicle dynamo D. Thus, for example, if the dynamo D is rated at 600 watts continuous duty or 1200 watts intermittent duty (i.e., 50 amps continuous duty or 100 amps intermittent duty at 12 volts DC), then the power tool or the like receiving power from output receptacle 32 should have a rating no greater than 600 watts continuous duty or 1200 watts intermittent duty (i.e., 5 amps continuous duty or 10 amps intermittent duty at 120 volts DC).

The typical power accessory unit of the present invention, as presented at FIGS. 1–3, is capable of usages other than the powering of 110–120 volt AC–DC power tools and the like. For example, with the current carrying capability of circuit breaker means 38 increased to 30 amps, for example, a pair of battery charging cables (not shown) can be plugged into power output receptacle 32. Then, with the vehicle engine running at about one-quarter throttle and the battery charging cables connected to a separate 12 volt DC battery needing charge, the switch 26 is switched to the "remote" position and the engine speed regulated to cause the ammeter 44 to read about 25 amps, for example. When using the unit for battery charging purposes, of course, since the load voltage is necessarily not more than about 12 volts DC, the power rating of the dynamo D can tolerate a greater current output than is the case when the output voltage requirement is higher. During a battery charging usage such as above described, the voltmeter 42 can be read to give an indication of the charging voltage, and consequently some indication of battery condition, i.e., the absence or presence of short or open battery cells.

The unit used can also be used to perform starter voltage tests. With the ignition wiring of the vehicle disconnected, and with connections from the output receptacle 32 to the motor terminal of the starter solenoid switch and to a good engine ground, when the engine is cranked in the normal manner and the voltage appearing across the output receptacle 32 is observed on the voltmeter 42, an evaluation of the voltage being applied to the starter can be made. As known, a normal starter voltage in a 12 volt DC electrical system is from about 9 to about 10.2 volts, and if the indicated voltage is lower, there is indication of a leaky battery, poor electrical connections, or a dragging starter, for example. As will be apparent, various other dynamic or static electrical system tests can be made directly from the unit by using the output receptacle 32 as an input to voltmeter 42, since said voltmeter 42 is at all times in circuit across the receptacle conductors 94, 110.

In the foregoing description and accompanying claims, it will be understood that what is termed a "dynamo" relates to a dynamoelectric mechanism for converting mechanical rotation to electrical energy, and that the term "dynamo" is generic to both DC generators and AC alternators (with built-in rectifier means), as are in widespread usage in engine driven vehicles. While the conventional vehicle electrical system shown at FIG. 3 is of a type which specifically employs a DC generator as the engine driven dynamo, with voltage regulator R having battery, field, and armature terminals B, F and A, it will be readily understood that conventional vehicle electrical systems which employ as the dynamo D an AC alternator with built-in rectifier means, incorporate several variations as to the voltage regulator means and specific connections thereto, such as the elimination of the voltage regulator terminal A with the dynamo output terminal DA delivering its power output to the vehicle electrical system by connection to the battery, either directly or through current limiting resistors, and/or through the vehicle ignition circuit. With regard to the nature of the dynamo, an alternator type dynamo is preferable for use in conjunction with the remote power output accessory of the present invention, since an alternator has the capability of generating a relatively larger current at lower engine speed.

With respect to the reference in the above description and accompanying claims to a vehicular electrical system wherein the low voltage is 12 volts DC, and to a higher voltage output from the unit U which approximates a 110–120 volt DC output, it will be understood that these voltage values are dictated by common usage in that most vehicular electrical systems are designed to operate at 12 volts DC, and most power output tools or the like are designed to operate at 110–120 volts AC–DC. However, it will be evident that the unit U can be designed with equal facility to operate in conjunction with vehicles having an electrical system of a different, relatively low DC voltage, e.g., 6 volts, 24 volts, or 32 volts, for example, and that the relatively higher voltage obtainable from the unit output receptacle can also be at a different voltage, if desired, since dynamo output voltage is a function of engine speed.

In like manner, the "vehicle" with which a power accessory unit according to the present invention is used, can be of any engine powered variety, such as automobiles, trucks, tractors, airplanes, and the like.

As will also be understood, the term "power tool or the like" contemplates a motor driven power tool such as a drill, saw, sander, etc., or any mobile equipment such as an air compressor, cement mixer, fluid pump, etc., which is powered by a DC type motor or an AC–DC type motor.

Further variations in equipment design and arrangement, and manner of use thereof, will readily occur to those skilled in the art to which the invention is addressed. Thus, simply by way of further example, in certain units the ammeter means 44 can be dispensed with, since with proper attention to power rating of the tool or the like which the unit is used to power, the internal impedance of the tool or the like automatically limits the current drain and proper engine speed for powering the tool can be determined simply on the basis of output voltage reading. Also, engine speed can be automatically regulated responsive to output voltage, as by a voltage sensing speed governing mechanism. The power accessory unit components also can readily be installed as vehicle original equipment, integrated with the other components of the vehicle instrument panel, or otherwise.

From the foregoing, further variations and adaptations of the present invention will readily occur to those skilled in the art to which the invention is addressed, within the scope of the following claims.

What is claimed is:

1. A power output accessory unit for use in an engine powered vehicle of the type having an electrical system including a DC storage battery; an engine driven dynamo with a field winding terminal and an output terminal which normally delivers low voltage DC power to the vehicle electrical system; and a voltage regulator receiving a power input from said DC storage battery, and having a field terminal connected to the field winding terminal of said dynamo; said power output accessory unit being designed to provide a power output at the vehicle for operating portable power tools or the like having a DC voltage power requirement greater than the battery voltage, and comprising:

(a) an independently fused, double conductor, low voltage DC output receptacle in circuit with the vehicle battery;

(b) an independently fused, double conductor, higher voltage DC output receptacle;

(c) double throw switch means having a pole connectible to the output terminal of the dynamo and movable to either a first position where such dynamo output is electrically connected to the vehicle electrical system for "normal" vehicle operation or is movable to a second position where such dynamo output becomes electrically disconnected from the vehicle electrical system and electrically connected to the ungrounded conductor of said higher voltage DC power output receptacle for "remote" operation of a power tool or the like; and (d) voltmeter means electrically connected to dynamically indicate the value of the output DC voltage appearing across the conductors of said higher voltage DC power output receptacle and permit the operator of the vehicle to regulate the speed of the vehicle engine and thereby maintain the value of such output DC voltage at a desired voltage when a power tool or the like is being powered by connection to the higher voltage DC power output receptacle.

2. A power output accessory unit according to claim 1, further comprising ammeter means electrically connected in series flow relation with the said pole of said double throw switch means to dynamically indicate the value of the current flow to said higher voltage DC power output receptacle when such pole is in its said second position.

3. A power output accessory unit according to claim 2, wherein said ammeter means is in circuit when the said pole of said double throw switch means is either in its said first position or in its said second position.

4. A power output accessory unit according to claim 1, wherein one conductor of said double conductor, low voltage DC power output receptacle is grounded and the other conductor thereof is connected to said DC storage battery so that such low voltage power output receptacle receives low voltage DC directly from said DC storage battery independently of the position of the pole of said double throw switch means.

5. A power output accessory unit according to claim 1, further comprising a second pole as a part of said double throw switch means and mechanically ganged to the first-mentioned pole of said double throw switch means, the said second pole having a first position and a second position respectively corresponding with the said first position and the said second position of the first-mentioned pole, and such second pole being operable in its said second position to energize means indicative to the operator of the vehicle that said double throw switch means is in its second position.

6. A power output accessory unit according to claim 5, wherein said vehicle indicator means is a low voltage light, and said second pole of the double throw switch means in its second position establishes electrical connection between the said low voltage light and the ungrounded conductor of said low voltage power output receptacle.

7. A power output accessory unit according to claim 5, further comprising an electrical conductor connectible to the field winding terminal of said dynamo and connectible to said second pole of the double throw switch means to maintain field energization in said dynamo by connection thereof to said DC storage battery independently of the voltage regulator when the said double throw switch means is in its said second position.

8. A power accessory unit according to claim 1, further comprising circuit breaker means in series circuit arrangement with the ungrounded conductor of said higher voltage DC power output receptacle.

9. A power accessory unit according to claim 4, further comprising circuit breaker means in series circuit arrangement between said DC storage battery and the ungrounded conductor of said low voltage DC power output receptacle.

10. A power output accessory unit for use in an engine powered vehicle of the type having an electrical system including a DC storage battery; an engine driven dynamo with a field winding terminal and an output terminal normally delivering low voltage DC power to the vehicle electrical system; and a voltage regulator receiving a power input from said DC storage battery, and having a field terminal connected to the field winding terminal of said dynamo; said power output accessory unit being designed to provide a power output at the vehicle for energizing portable power tools or the like having a higher voltage DC power requirement, and comprising:

(a) a double conductor, higher voltage DC output receptacle;

(b) double throw switch means having a pole connectible to the output terminal of the dynamo and movable to either a first position where such dynamo output is electrically connected to the vehicle electrical system for "normal" vehicle operation or is movable to a second position where such dynamo output is electrically disconnected from the vehicle electrical system and electrically connected to the ungrounded conductor of said higher voltage DC power output receptacle for "remote" operation of a power tool or the like;

(c) voltmeter means electrically connected to dynamically indicate the value of the output DC voltage appearing across the conductors of said higher voltage DC power output receptacle and enable the operator of the vehicle to regulate the speed of the vehicle engine and thereby maintain the value of such output DC voltage at a desired voltage when a power tool or the like is being powered by connection to said higher voltage DC power output receptacle;

(d) ammeter means electrically connected in series flow relation with the said pole of said double throw switch means to dynamically indicate the value of the current flow to said higher voltage DC power output receptacle when such pole is in its said second position;

(e) a double conductor, low voltage DC power output receptacle with one conductor thereof grounded and the other conductor thereof connectible to said DC storage battery so that such low voltage power output receptacle receives low voltage DC directly from said DC storage battery independently of the position of the pole of said double throw switch means;

(f) a second pole as a part of said double throw switch means and mechanically ganged to the first-mentioned pole of said double throw switch means, the said second pole having a first position and a second position respectively corresponding with the said first position and the said second position of the first-mentioned pole; and (g) an electrical conductor connectible to the field winding terminal of said dynamo and connectible to said second pole of the double throw switch means so that field energization is maintained in said dynamo by connection thereof to said DC storage battery independently of the voltage regulator when the said double throw switch means is in its said second position.

11. In combination with an engine powered vehicle of the type having an electrical system including a DC storage battery; an engine driven dynamo with a field winding terminal and an output terminal normally delivering low voltage DC power to the vehicle electrical system; and a voltage regulator receiving a power input from said DC storage battery, and having a field terminal connected to the field winding terminal of said dynamo; a power output accessory unit for operating portable power tools or the like operable on higher voltage DC power, said accessory unit comprising:
  (a) an independently fused, double conductor, low voltage DC output receptacle in circuit with the vehicle battery;
  (b) a double conductor, higher voltage DC output receptacle;
  (c) double throw switch means having a pole connected to the output terminal of the dynamo and movable to either a first position where such dynamo output is electrically connected to the vehicle electrical system for "normal" vehicle operation or is movable to a second position where such dynamo output becomes electrically disconnected from the vehicle electrical system and electrically connected to the ungrounded conductor of said higher voltage DC power output receptacle for "remote" operation of a power tool or the like; and
  (d) voltmeter means electrically connected to dynamically indicate the value of the output DC voltage appearing across the conductors of said higher voltage power output receptacle and enable the operator of the vehicle to regulate the speed of the vehicle engine and thereby to maintain the value of such output DC voltage at a desired voltage when a power tool or the like is being powered by connection to said higher voltage DC power output receptacle.

12. The combination recited in claim 11, further comprising ammeter means electrically connected in series flow relation with the said pole of said double throw switch means to dynamically indicate the value of the current flow to said higher voltage DC power output receptacle when such pole is in its said second position.

13. The combination recited in claim 12, wherein said ammeter means is in circuit when the said pole of said double throw switch means is either in its said first position or in its said second position.

14. The combination recited in claim 11, wherein one conductor of said double conductor, low voltage DC power output receptacle is grounded to said vehicle and the other conductor thereof connected to said DC storage battery so that such low voltage power output receptacle receives low voltage DC directly from said DC storage battery independently of the position of the pole of said double throw switch means.

15. The combination recited in claim 14, further comprising a second pole as a part of said double throw switch means and mechanically ganged to the first-mentioned pole of said double throw switch means, the said second pole having a first position and a second position respectively corresponding when the said first position and the said second position of the first-mentioned pole, and such second pole being operable in its said second position to energize means indicative to the operator of a vehicle that said double throw switch means is in its second position.

16. The combination recited in claim 15, wherein said vehicle indicator means is a low voltage light, and the said second pole of the double throw switch means in its second position establishes electrical connection between the said low voltage light and the ungrounded conductor of said low voltage power output receptacle.

17. The combination recited in claim 15, further comprising an electrical conductor connected to the field winding terminal of said dynamo and connectible to said second pole of the double throw switch means so that field energization is maintained in said dynamo by connection thereof to said DC storage battery independently of the voltage regulator when the said double throw switch means is in its second position.

18. The combination recited in claim 11, further comprising case means in which elements of said accessory unit are housed, said case means being mounted conjunctively with the instrument panel of the vehicle.

19. The combination recited in claim 13, further comprising case means in which elements of said accessory unit are housed and the said voltmeter means and said ammeter means are displayed conjunctively with the instrument panel of the vehicle, such ammeter means thereby providing an indication of extent of current flow during "normal" operation of the vehicle.

20. The combination recited in claim 11, wherein said low voltage is 12 volts and said higher voltage is 110–120 volts.

21. In combination with an engine powered vehicle of the type having an electrical system including a DC storage battery; an engine driven dynamo with a field winding terminal, and an output terminal normally delivering 12 volt DC power to the vehicle electrical system; and a voltage regulator receiving a power input from said DC storage battery, and having a field terminal connected to the field winding terminal of said dynamo; a power output accessory unit for operating portable power tools or the like having a 110–120 volt AC–DC power requirement, said accessory unit comprising:
  (a) a double conductor 110–120 volt DC output receptacle;
  (b) double throw switch means having a pole connected to the output terminal of the dynamo and either is movable to a first position where such dynamo output is electrically connected to the vehicle electrical system for "normal" vehicle operation or is movable to a second position where such dynamo output is electrically disconnected from the vehicle electrical system and is electrically connected to the ungrounded conductor of said 110–120 volt DC power output receptacle for "remote" operation of a power tool or the like;
  (c) voltmeter means electrically connected to dynamically indicate the value of the output DC voltage appearing across the conductors of said 110–120 volt DC power output receptacle and enable the operator of the vehicle to regulate the speed of the vehicle engine and thereby maintain the value of such output DC voltage at a desired voltage when a power tool or the like is being powered by connection to 110–120 volt DC power output receptacle;
  (d) ammeter means electrically connected in series flow relation with the said pole of said double throw switch means to dynamically indicate the value of the current flow to said 110–120 volt DC power output receptacle when such pole is in its said second position;
  (e) a double conductor 12 volt DC power output receptacle with one conductor thereof grounded to said vehicle and the other conductor thereof connected to said DC storage battery so that such 12 volt power output receptacle receives 12 volts DC voltage directly from said DC storage battery independently of the position of the pole of said double throw switch means;
  (f) a second pole as a part of said double throw switch means and mechanically ganged to the first-mentioned pole of said double throw switch means, the said second pole having first and second positions respectively corresponding with the first and second positions of the first-mentioned switch pole, such second pole in its second position operating to connect 12 volts DC to the field winding of the dynamo by direct connection to the battery and independent of the said voltage regulator; and (g) case means in which elements of said accessory unit are housed, said case means being mounted conjunctively with the instrument panel of the vehicle.

References Cited

UNITED STATES PATENTS 3,127,518 3/1964 Pruitt _____ 307—10
3,293,443 12/1966 Burch _____ 307—10
3,341,762 9/1967 Rockoff _____ 320—48

ROBERT K. SCHAEFER, Primary Examiner

D. SMITH, JR., Assistant Examiner

U.S. Cl. X. R.

320—48; 290—50